United States Patent [19]

Thomas

[11] Patent Number: 5,499,611

[45] Date of Patent: Mar. 19, 1996

[54] LITTER BOX SLATTED SPACING SHELF

[76] Inventor: Stephen P. Thomas, P.O. Box 1726, Vashon, Isl., Wash. 98070

[21] Appl. No.: 377,970

[22] Filed: Jan. 25, 1995

[51] Int. Cl.⁶ .................................................. A01K 1/01
[52] U.S. Cl. ........................................ 119/166; 119/168
[58] Field of Search ............................. 119/19, 166, 167, 119/168, 165

[56] References Cited

U.S. PATENT DOCUMENTS

| | | | |
|---|---|---|---|
| 2,963,003 | 12/1960 | Oberg et al. | 119/166 |
| 3,332,397 | 7/1967 | Vanderwall | 119/166 |
| 3,476,033 | 11/1969 | Vanderwall | 119/166 |
| 3,760,769 | 9/1973 | Erfeling | 119/19 |
| 3,905,333 | 9/1975 | Uhrig | 119/19 |
| 3,930,467 | 1/1976 | Fier, Jr. | 119/19 |
| 3,968,863 | 6/1976 | Scott | 119/166 |
| 4,517,920 | 5/1985 | Yamamoto | 119/166 |
| 4,559,903 | 12/1985 | Bloom et al. | 119/19 |
| 4,771,731 | 9/1988 | Derx et al. | 119/166 |
| 5,012,765 | 5/1991 | Naso et al. | 119/166 |
| 5,168,834 | 12/1992 | Buscher | 119/166 |
| 5,249,549 | 10/1993 | Rockaitis, III | 119/165 |
| 5,293,837 | 3/1994 | Caldwell | 119/166 |

*Primary Examiner*—Paul J. Hirsch

[57] ABSTRACT

A shelf for supporting cat litter within a litter box in a spaced relationship relative to a floor of the box. The inventive device includes a perimeter frame having a plurality of spaced slats extending thereacross so as to support litter above potentially toxic deodorant or disinfectant materials positioned beneath the perimeter frame within the box. A locking assembly permits selective movement of the slats relative to the perimeter frame to facilitate ease of cleaning of the device.

4 Claims, 4 Drawing Sheets

LITTER BOX SLATTED SPACING SHELF

BACKGROUND OF THE INVENTION

1. Field of the Invention

The present invention relates to litter box devices and more particularly pertains to an litter box slatted spacing shelf for supporting cat litter within a litter box in a spaced relationship relative to a floor of the box.

2. Description of the Prior Art

The use of litter box devices is known in the prior art. More specifically, litter box devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art litter box devices include U.S. Pat. 5,211,133; U.S. Pat. 5,184,574; U.S. Pat. 5,193,488; and U.S. Pat. 5,121,712.

While these devices fulfill their respective, particular objectives and requirements, the aforementioned patents do not disclose a litter box slatted spacing shelf for supporting cat litter within a litter box in spaced relationship relative to a floor of the box which includes a perimeter frame having a plurality of spaced slats extending thereacross so as to support litter above potentially toxic deodorant or disinfectant materials positioned beneath the perimeter frame within the box, and a locking assembly for permitting selective movement of the slats relative to the perimeter frame to facilitate ease of cleaning of the device.

In these respects, the litter box slatted spacing shelf according to the present invention substantially departs from the conventional concepts and designs of the prior art, and in so doing provides an apparatus primarily developed for the purpose of supporting cat litter within a cat litter box in a spaced relationship relative to a floor of the box.

SUMMARY OF THE INVENTION

In view of the foregoing disadvantages inherent in the known types of litter box devices now present in the prior art, the present invention provides a new litter box slatted spacing shelf construction wherein the same can be utilized for supporting cat litter in a spaced relationship relative to a floor of a litter box. As such, the general purpose of the present invention, which will be described subsequently in greater detail, is to provide a new litter box slatted spacing shelf apparatus and method which has many of the advantages of the litter box devices mentioned heretofore and many novel features that result in a litter box slatted spacing shelf which is not anticipated, rendered obvious, suggested, or even implied by any of the prior art litter box devices, either alone or in any combination thereof.

To attain this, the present invention generally comprises a shelf for supporting cat litter within a litter box in a spaced relationship relative to a floor of the box. The inventive device includes a perimeter frame having a plurality of spaced slats extending thereacross so as to support litter above potentially toxic deodorant or disinfectant materials positioned beneath the perimeter frame within the box. A locking assembly permits selective movement of the slats relative to the perimeter frame to facilitate ease of cleaning of the device.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new litter box slatted spacing shelf apparatus and method which has many of the advantages of the litter box devices mentioned heretofore and many novel features that result in a litter box slatted spacing shelf which is not anticipated, rendered obvious, suggested, or even implied by any of the prior art litter box devices, either alone or in any combination thereof.

It is another object of the present invention to provide a new litter box slatted spacing shelf which may be easily and efficiently manufactured and marketed.

It is a further object of the present invention to provide a new litter box slatted spacing shelf which is of a durable and reliable construction.

An even further object of the present invention is to provide a new litter box slatted spacing shelf which is susceptible of a low cost of manufacture with regard to both materials and labor, and which accordingly is then susceptible of low prices of sale to the consuming public, thereby making such litter box slatted spacing shelves economically available to the buying public.

Still yet another object of the present invention is to provide a new litter box slatted spacing shelf which provides in the apparatuses and methods of the prior art some of the advantages thereof, while simultaneously overcoming some of the disadvantages normally associated therewith.

Still another object of the present invention is to provide a new litter box slatted spacing shelf for supporting cat litter in a spaced relationship relative to a floor of a cat litter box.

Yet another object of the present invention is to provide a new litter box slatted spacing shelf which includes a perimeter frame having a plurality of spaced slats extending thereacross so as to support litter above potentially toxic deodorant or disinfectant materials positioned beneath the perimeter frame within the box, and a locking assembly for permitting selective movement of the slats relative to the perimeter frame to facilitate ease of cleaning of the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
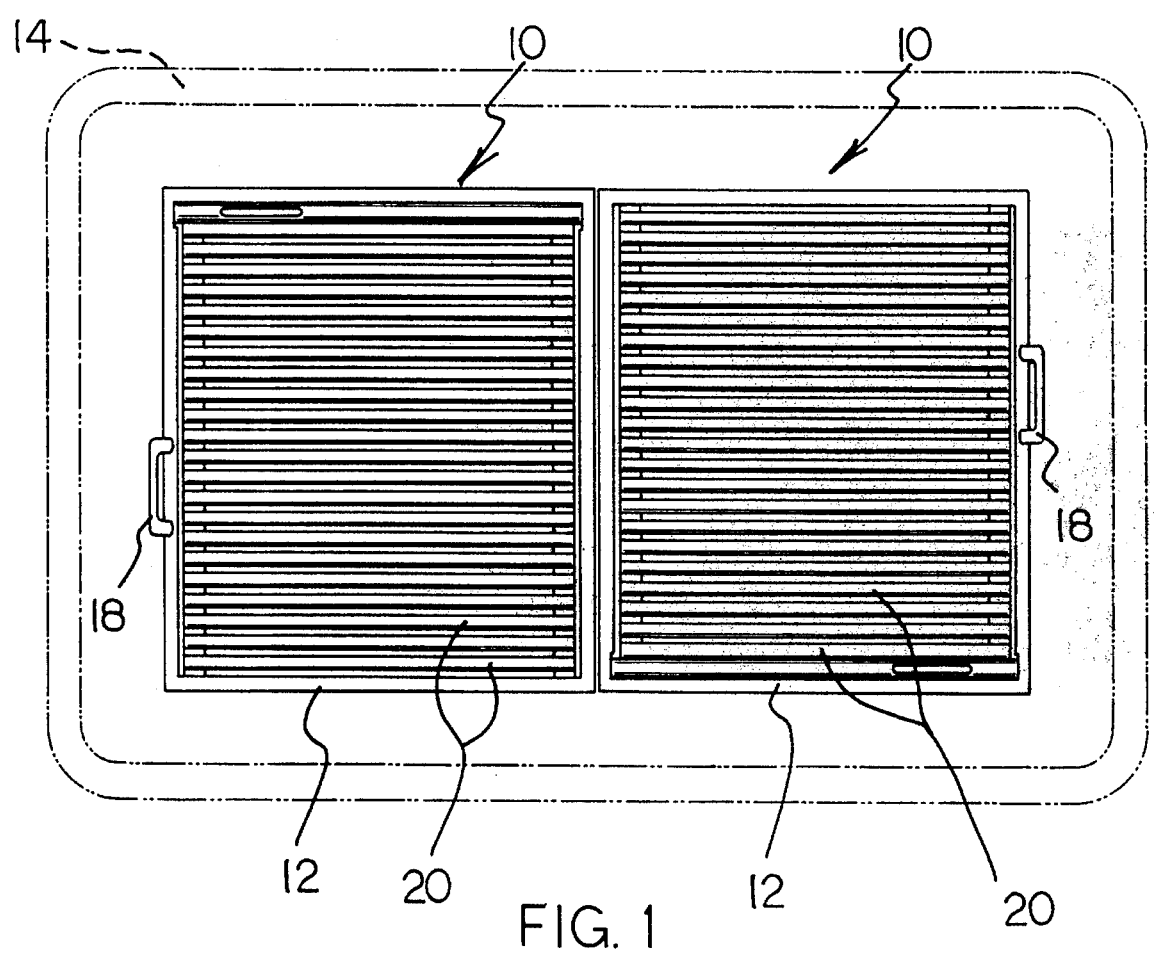
FIG. 1 is a top plan view of a pair of litter box slatted spacing shelves according to the present invention in use.

With reference now to the drawings, and in particular to FIGS. 1–8 thereof, a new litter box slatted spacing shelf embodying the principles and concepts of the present invention and generally designated by the reference numeral 10 will be described.

Figure 2:
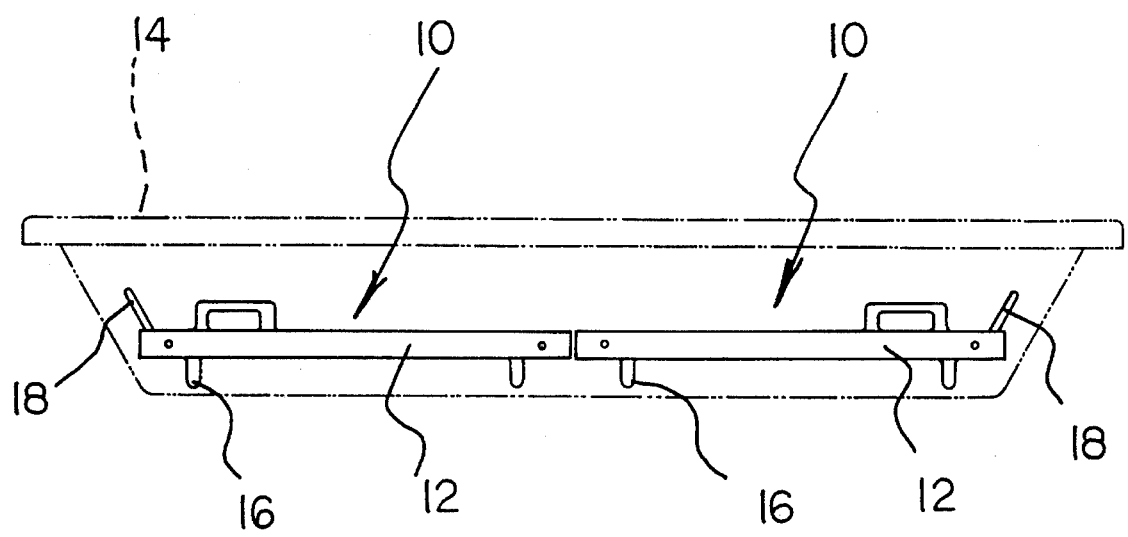
FIG. 2 is a side elevation view of the shelves in use.

More specifically, it will be noted that the litter box slatted spacing shelf 10 comprises a preferably rectangular perimeter frame 12 positionable within a litter box 14 substantially as shown in FIGS. 1 and 2 of the drawings. Preferably, the perimeter frame 12 is dimensioned such that a pair of the litter box slatted spacing shelves 10 can be positioned within the litter box 14, whereby cleaning of the shelves can be accomplished through a ninety degree rotation and stacking of the shelves within the litter box 14 permitting a water and soap solution to be introduced into the litter box 14 and agitated to effect concurrent cleaning of the device 10 and the interior of the litter box. However, it is within the intent and purview of the present invention to dimension the perimeter frame 12 such that a single litter box slatted spacing shelf 10 will substantially coextensively cover an unlabeled floor of the litter box 14.

The perimeter frame 12 is supported in a substantially spaced and parallel orientation relative to a floor of the litter box 14 by a plurality of supporting feet 16 projecting downwardly from the perimeter frame 12, as best illustrated in FIG. 2. A frame handle 18 projecting from an upper portion of the perimeter frame 12 permits manual manipulation of the device 10 during installation and/or removal thereof.

Figure 3:
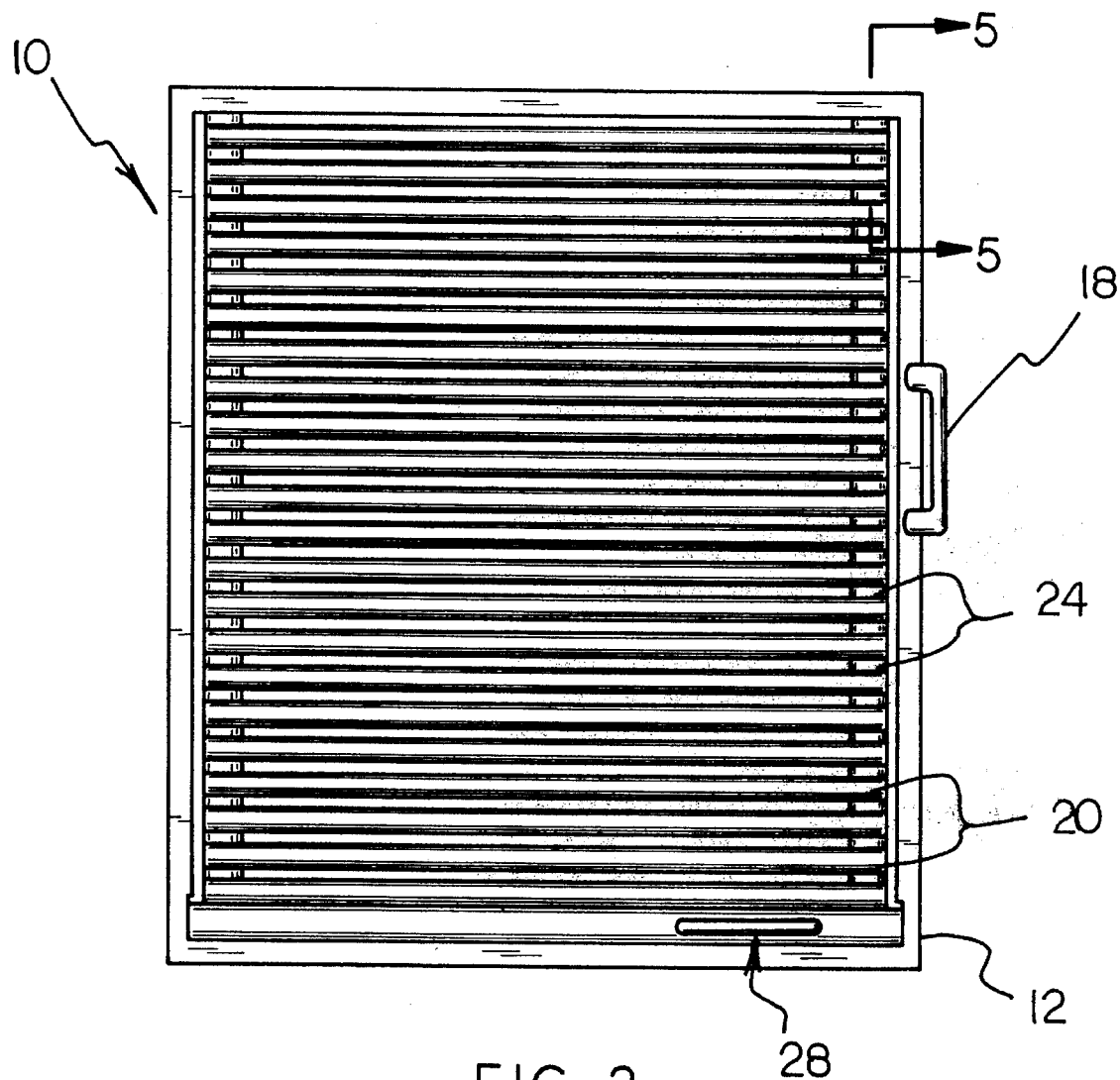
FIG. 3 is a top plan view of a single shelf.
Figure 4:
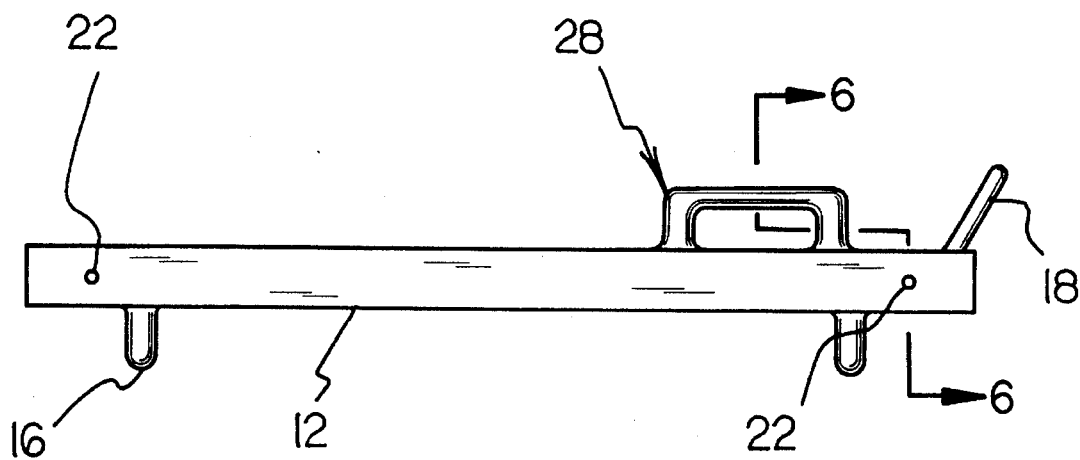
FIG. 4 is a side elevation view thereof.
Figure 5:
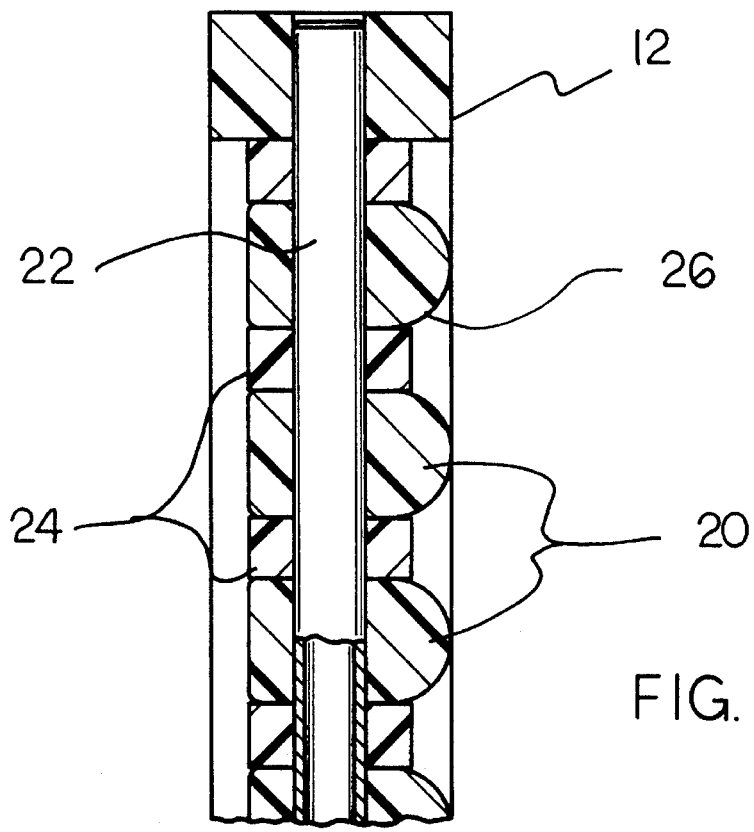
FIG. 5 is a cross sectional view taken along line 5—5 of FIG. 3.

To support a volume of cat litter in a spaced relationship relative to a floor of the litter box 14, a plurality of slats 20 extend in substantially spaced and parallel orientation across the perimeter frame 12. To this end, and as shown in FIGS. 3 through 5 of the drawings, a pair of slat support rods 22 extend across the perimeter frame 12 and project through apertures in each of the slats 20 located proximal to respectively opposed ends of the slats. A plurality of spacers 24 are interposed between adjacent slats 20 so as to support the same in a substantially spaced and parallel orientation relative to one another. Preferably, the slats 20 are spaced a distance apart sufficient to preclude passage of a granule of litter material therebetween, while simultaneously allowing fluid such as urine or the like to pass between the slats 20. To this end, and as shown in FIG. 5, the slats desirably include arcuate upper surfaces 26 which encourage passage of liquids between the slats. By this structure, a volume of cat litter can be supported in a spaced relationship relative to a bottom of the litter box 14, as shown in FIG. 2, whereby urine expelled from a pet is permitted to leach through the cat litter for deposition beneath the perimeter frame 12. If desired, a deodorant or disinfectant material can be positioned beneath the device 10 within the litter box 14, whereby the litter and associated pet residing on top of the device 10 will be separated from a potentially harmful or toxic material positioned therebeneath. Thus, the present invention allows an individual to utilize a substantially stronger deodorant and/or disinfectant material within the litter box 14 without such stronger material contacting the litter or associated pet.

Figure 6:
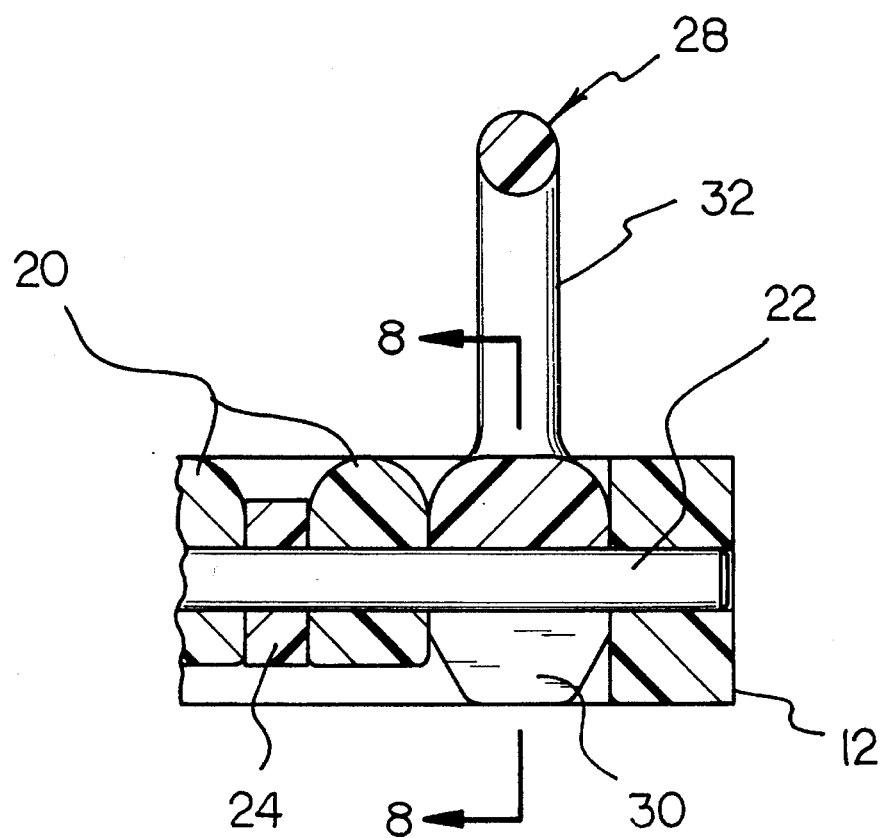
FIG. 6 is a cross sectional view taken along line 6—6 of FIG. 4.
Figure 7:
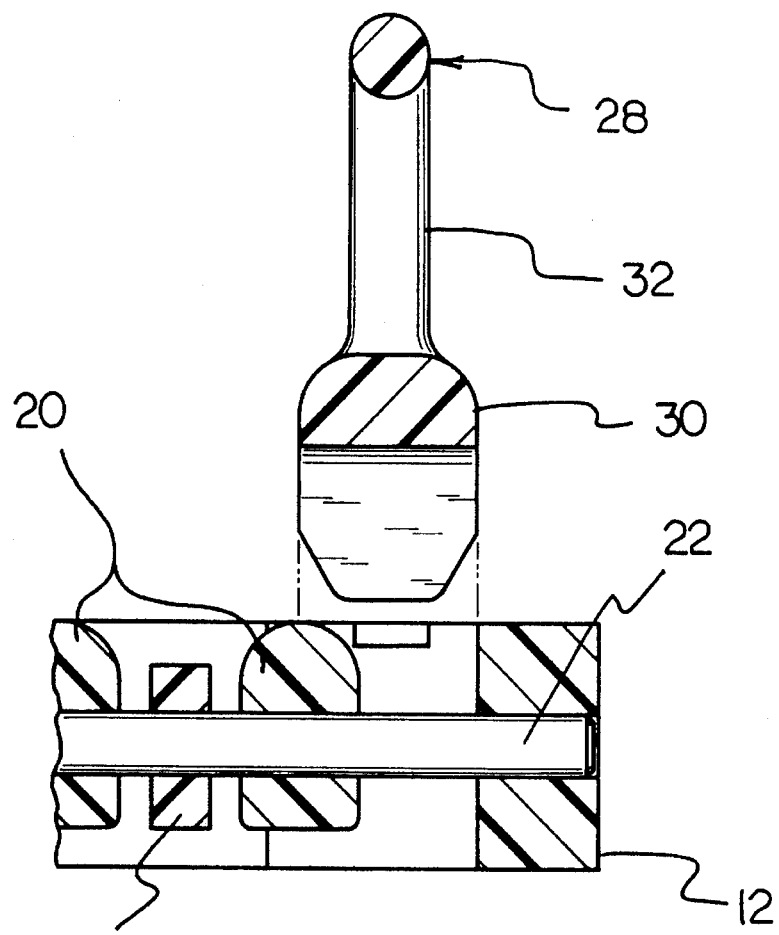
FIG. 7 is an exploded cross sectional view illustrating a removal of a locking wedge permitting movement of the slats relative the perimeter frame of the invention.
Figure 8:
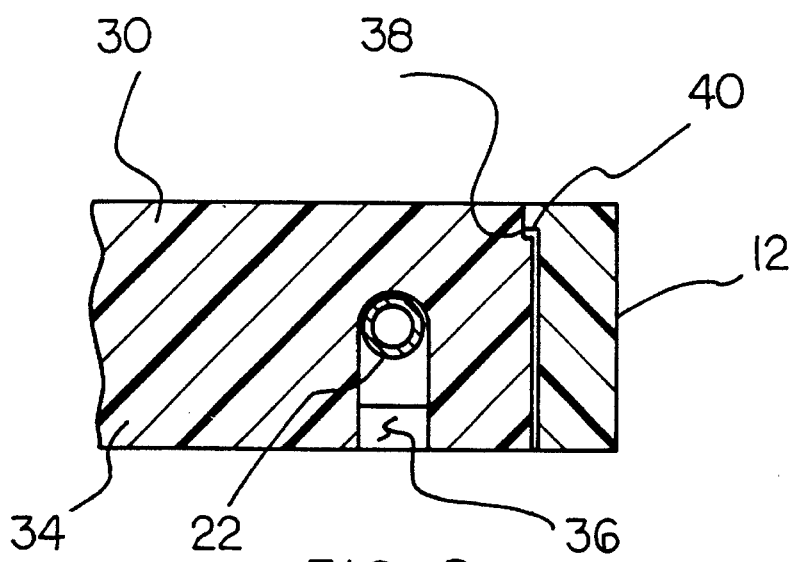
FIG. 8 is a cross sectional view taken along line 8—8 of FIG. 6.

To permit ease of cleaning of the device 10 whereby cat litter wedged between adjacent slats 20 can be easily removed therefrom, a locking means 28 is provided with the present invention 10 for selectively permitting and precluding movement of the slats relative to the perimeter frame 12. To this end, and as best illustrated in FIGS. 6 through 8, it can be shown that the locking means 28 according to the present invention 10 preferably comprises a locking wedge 30 which can be positioned between one of the slats 20 and a portion of the perimeter frame 12. A locking wedge handle 32 is coupled to the locking wedge 30 to permit manual insertion and removal of the locking wedge relative to the perimeter frame 12. As shown in FIG. 7, the locking wedge 30 can be selectively disengaged from the perimeter frame 12 to permit movement of the slats 20 and the spacers 24 along the slat support rods 22, whereby cat litter or other debris captured between adjacent slats 20 is free to fall therefrom. As shown in FIG. 8, the locking wedge 30 preferably comprises an elongated member 34 having a pair of slots 36 directed thereinto which permit a passage of the slat support rods 22 therethrough such that the locking wedge 30 can be positioned into a substantially parallel orientation proximal to one of the slats 20. To secure the elongated member 34 relative to the perimeter frame 12, the locking wedge 30 desirably includes a detent notch 38 which receives a projection 40 extending from an interior portion of the perimeter frame 12, whereby the resilient nature of the locking wedge and/or the perimeter frame permits selective decoupling of the locking wedge 30 therefrom. By this structure, the locking wedge 30 can be selectively removed from the perimeter frame 12 to permit the slats 20 and the spacers 24 to freely slide along the slat support rods 22 as described above.

In use, the litter box slatted spacing shelf 10 according to the present invention can be easily utilized to support a volume of litter above potentially toxic deodorant and/or disinfectant materials positioned along a floor of the litter box 14. The volume of litter utilized in conjunction with the device 10 is desirably reduced over a period of time and may in fact be completely eliminated, whereby a pet utilizing the device 10 simply resides upon the slats 20, with urine directed from the pet flowing between adjacent slats 20 and into contact with the deodorant and/or disinfectant material positioned below the perimeter frame 12 within the litter box 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A litter box slatted spacing shelf comprising:

a perimeter frame positionable within a litter box;

a plurality of slats extending in substantially spaced and parallel orientation across the perimeter frame;

a pair of slat support rods extending across the perimeter frame and projecting through apertures in each of the slats located proximal to respectively opposed ends of the slats to support the slats in the substantially spaced and parallel orientation across the perimeter frame;

a plurality of spacers interposed between adjacent slats so as to support the slats in a substantially spaced and parallel orientation relative to one another; and, a locking means for selectively permitting and precluding movement of the slats relative to the perimeter frame over the support rods, the locking means comprising a locking wedge positioned between one of the slats and a portion of the perimeter frame; and a locking wedge handle coupled to the locking wedge to permit manual insertion and removal of the locking wedge relative to the perimeter frame, wherein the locking wedge can be selectively disengaged from the perimeter frame to permit movement of the slats and the spacers along the slat support rods, whereby debris captured between adjacent slats is free to fall therefrom.

2. A litter box slatted spacing shelf comprising:

a rectangular perimeter frame positionable within a litter box;

a plurality of supporting feet projecting downwardly from the perimeter frame to support the perimeter frame in a substantially spaced and parallel orientation relative to a floor of a litter box;

a plurality of slats extending in substantially spaced and parallel orientation across the perimeter frame;

wherein a pair of slat support rods extend across the perimeter frame and project through apertures in each of the slats located proximal to respectively opposed ends of the slats to support the slats in the substantially spaced and parallel orientation across the perimeter frame;

wherein a plurality of spacers are interposed between adjacent slats so as to support the slats in a substantially spaced and parallel orientation relative to one another;

wherein the slats each include arcuate upper surfaces which encourage passage of liquids between the slats;

and further comprising a locking means for selectively permitting and precluding movement of the slats relative to the perimeter frame over the support rods;

wherein the locking means comprises a locking wedge positioned between one of the slats and a portion of the perimeter frame; and a locking wedge handle coupled to the locking wedge to permit manual insertion and removal of the locking wedge relative to the perimeter frame, wherein the locking wedge can be selectively disengaged from the perimeter frame to permit movement of the slats and the spacers along the slat support rods, whereby debris captured between adjacent slats is free to fall therefrom.

3. The litter box slatted spacing shelf of claim 1, wherein the locking wedge comprises an elongated member having a pair of slots directed thereinto which permit a passage of the slat support rods therethrough such that the locking wedge can be positioned into a substantially parallel orientation proximal to one of the slats.

4. The litter box slatted spacing shelf of claim 3, wherein the locking wedge includes a detent notch; and further wherein the perimeter frame includes a projection extending from an interior portion of the perimeter frame into the detent notch to removably couple the locking wedge thereto.

* * * * *